May 9, 1961 B. FIELD 2,983,787
AUTOMATIC GAIN CONTROL SYSTEM FOR A TELEVISION RECEIVER
Filed Oct. 24, 1958
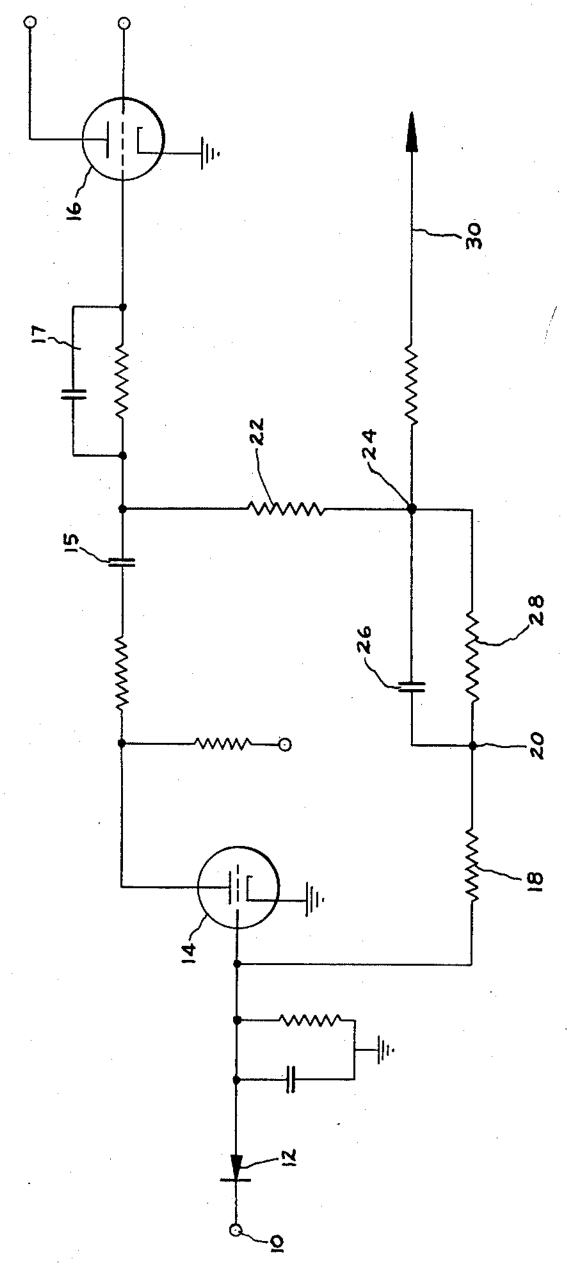
INVENTOR.
BORIS FIELD
BY Joseph Levinson
HIS ATTORNEY

United States Patent Office 2,983,787

Patented May 9, 1961

2,983,787

AUTOMATIC GAIN CONTROL SYSTEM FOR A TELEVISION RECEIVER

Boris Field, Phoenix, Ariz., assignor to General Electric Company, a corporation of New York Filed Oct. 24, 1958, Ser. No. 769,441

4 Claims. (Cl. 178—7.3)

This invention relates to an automatic gain control circuit for a television receiver.

In television receivers, it is desirable to have the same output from the receiver regardless of the magnitude of the incoming signal to which the receiver is tuned. Otherwise, the viewer would be required to adjust the contrast control whenever the strength of the incoming signal changes.

In automatic gain control (AGC) systems, the amplitude of the receiver carrier signal is automatically reduced with increased signal strength to supply a relatively constant input signal level to the second detector thereby providing a relatively constant output therefrom even though the strength of the received carrier may vary considerably. This is accomplished by applying a negative direct current control voltage that is proportional to the carrier signal strength to the radio frequency (RF) and intermediate frequency (IF) stages preceding the second detector. The greater the negative bias applied to the RF and IF stages, the less the gain in the stage to which it is applied.

The bias or AGC voltage may be obtained from a rectified signal e.g., second detector, with the diode load resistance connected in the plate circuit of the diode to provide a negative voltage thereon. However, long time constant filters must be provided between the AGC source and the controlled stages to prevent the AGC from varying in accordance with signal intelligence variations.

A better method for obtaining AGC for television receivers resides in the use of a combination of the direct current voltage taken from the sync clipper grid circuit and the video detector. When these two voltages are properly combined, an AGC voltage is available at a given point which is directly proportional to the diode level of the receiver and is independent of picture modulation. Furthermore, this AGC voltage needs no further filtering because at this given point video information from the two inputs is substantially cancelled. However, due to the use of high gain in the RF-IF stages of present television receivers, more AGC voltage is normally required than is available at the aforesaid point. This necessitates using more sync clipper grid voltage which is higher due to a stage of sync or video amplification which precedes the sync clipper in the receiver. At the higher AGC take-off point, the video from the second detector and the sync clipper grid no longer cancel. Accordingly, long time constant filters are again required between the AGC source and the controlled stages. These filters are undesirable because they deteriorate the receiver performance with respect to airplane flutter and constitute an added expense. Also, the overall AGC performance becomes unstable due to transients caused in switching channels or due to extreme changes in picture modulation.

Accordingly, it is an object of this invention to provide an improved AGC system for a television receiver which allows more sync clipper grid voltage to be used without sacrificing cancellation of the video signals at the AGC take-off point and the resultant advantages flowing therefrom.

In carrying out this invention in one illustrative embodiment thereof, a direct current voltage from the sync clipper grid circuit and from the second detector are matrixed to provide a first AGC voltage take-off point which has substantial video cancellation and a direct current output level which is independent of picture modulation. A second AGC take-off point is provided having a higher direct current output level, and means are provided for coupling said second point to said first point for providing video cancellation at the second point.

These and other advantages of this invention will be more clearly understood from the following description taken in connection with the accompanying drawing, and its scope will be apparent from the appended claims.

The drawing shows a simplified schematic diagram of the automatic gain control system embodied in this invention.

Referring now to the drawing, an intermediate frequency composite video signal is applied to an IF input terminal 10 which is connected to a video detector 12. The output of the video detector 12 has a negative direct current component and a negative-going video component. The negative-going D.C. output of the video detector 12 appears across a resistor 18 along with the negative-going video signal which is also amplified and inverted by a sync or video amplifier 14. The output of the sync or video amplifier 14 which is now a positive-going video signal is coupled by a capacitor 15 and a fast time constant circuit 17 to a sync separator 16. A resistor 22 is connected to the junction of capacitor 15 and the time constant circuit 17. The fast time constant circuit 17 which includes a shunt resistor and a capacitor acts to prevent sharp noise pulses from acting upon and disturbing the action of the sync separator 16. The capacitor 15 and the resistor 22 form a slow time constant circuit to maintain a high negative voltage on the grid of the sync separator 16. This large negative voltage appears due to rectification between the grid and cathode of the sync separator 16. Consequently, a negative D.C. voltage appears across resistor 22 along with the positive-going video signal. The resistor 22 is connected to a point 24, and the resistance 18 is connected to a point 20. The points 20 and 24 are coupled together by resistor 28 and a shunt capacitor 26.

Since a negative D.C. voltage appears across both resistors 18 and 22, these resistors act as a voltage divider. Furthermore, negative-going video signals appear across the resistor 18 and positive-going video signals appear across the resistor 22, and at some appropriate point thereon the video signals are equal and opposite and cancel. This point would occur approximately where $R_{22}=(G-1)R_{18}$, where G is equal to the gain of the sync amplifier 14. As would be expected, this point for example would be point 20, which is close to the low end of the voltage divider where only a small negative voltage is available for automatic gain control purposes. At point 20 there exists the D.C. available at the video detector 12 which is maximum for black and minimum for white signals, and the D.C. at the sync clipper which is just the opposite thereby providing a D.C. output proportional only to the IF input level of the video detector 12. However, since only a small D.C. voltage is available at the point 20 for AGC purposes, resistor 28 has been connected between points 20 and 24 to supply a higher negative voltage to the RF and IF stages from point 24 than would be available at the normal cancellation point 20. However, when this is done, video cancelation no longer occurs at the point 24 thereby necessitating the use of slow time constant circuits between the AGC output and the stages to be controlled. As a consequence, the receiver is no longer able to adjust rapidly and will be subject to instability on channel switching, airplane flutter and extreme changes in picture modulation. To overcome this difficulty the capacitor 26 couples the point 24 to the point 20. Consequently, video information appearing at point 24 is effectively by-passed by a capacitor 26 around resistor 28 to provide sufficient video cancellation such that long time constant circuits are no longer necessary. In practice a small capacitor, not shown, would be connected between the AGC output bus 30 and ground to by-pass uncancelled video signals.

The magnitude of the resistor 28 may be varied to supply whatever higher negative voltage is required on the AGC bus 30. Different values of AGC may be taken from the AGC line for application to the RF and IF stages if desired. Also a delay circuit may be provided between the AGC line and the RF stages. Point 20 might be used to supply AGC to the IF stages if a smaller amount of voltage is required. However, this system was designed for high gain RF-IF systems which generally require higher voltages to provide proper control.

By way of example only, circuit parameters for one particular application of this invention are as follows:

| | | |
|---|---|---|
| Resistor **18** | ohms | 75,000 |
| Resistor **22** | megohms | 2 |
| Resistor **28** | ohms | 270,000 |
| Capacitor **26** | microfarads | 0.1 |

Gain of sync amplifier 14 approximately 35.

A simplified circuit has been shown for explanation purposes. The portions of a television receiver which have not been shown or described are believed to be well known to those skilled in the art. For example, a circuit is shown in an application bearing Serial Number 751,103, which is assigned to the assignee of the present invention, which shows the present automatic gain control system being utilized in a more complete television receiver circuit.

The present automatic gain control system eliminates the expense of costly slow acting automatic gain control circuits thereby providing quick response to eliminate receiver instability.

Since other modifications and changes varied to fit particular operating requirements and environments will be apparent to those skilled in the art, this invention is not considered limited to the examples chosen for purposes of disclosure and covers all changes and modifications which do not constitute departures from the true spirit and scope of this invention.

What I claim as new and desire to secure by Letters Patent of the United States is:

1. A circuit for providing a large automatic gain control voltage for a television receiver which is substantially free of video components comprising in combination, a video detector poled so as to develop a negative-going output, means for aplying a composite video signal to said detector, a video amplifier coupled to said video detector for amplifying and inverting the negative-going video component from the output of said second detector, a sync separator having a grid circuit coupled to said video detector and having a negative bias voltage on the grid input circuit thereof as well as the positive-going video components coupled thereto from said video amplifier, a first resistor coupled to the output of said video detector and a second resistor coupled to the grid input circuit of said sync separator with the resistances of said first and second resistors being matrixed to provide a first point having video component cancellation and a direct current component which is proportional to the peak carrier amplitude of said composite video signal, a third resistor coupled between said first and second resistors for providing a point between said second and third resistors having a higher negative direct current potential than said first point which may be utilized for automatic gain control purposes, and a capacitor connected in shunt with said third resistor for providing substantial video component cancellation at said point between said second and third resistors.

2. An automatic gain control system for a television receiver having a detector stage, an amplifier stage, and a sync separator stage coupled in the order named, means for applying a composite video signal to said detector stage, a first resistor connected on one terminal thereof to the output of said detector for developing a negative-going video component and a negative direct current component, a second resistor connected on one terminal thereof to the input of said sync separator stage for developing a positive-going video component and a negative direct current component, impedance means interconnecting the other terminals of said first and second resistors for providing a larger negative direct current voltage at the junction between said impedance means and said first resistor than would have been obtained from the junction of a direct connection between the other terminals of said first and said second resistors and means shunted across said impedance means for providing for video component cancellation at the terminals of said impedance means.

3. The structure defined in claim 2 wherein said impedance means comprises a resistor.

4. The structure defined in claim 2 wherein said means shunted across said impedance means comprises a capacitor.

References Cited in the file of this patent

UNITED STATES PATENTS

| | | |
|---|---|---|
| 2,269,540 | Loughren | Jan. 13, 1942 |
| 2,319,663 | Crowley | May 18, 1943 |
| 2,750,457 | Padgett | June 12, 1956 |